(12) United States Patent
Meyer et al.

(10) Patent No.: US 10,157,510 B2
(45) Date of Patent: Dec. 18, 2018

(54) VEHICLE ENERGY CONSUMPTION EFFICIENCY LEARNING IN THE ENERGY DOMAIN

(71) Applicant: FORD GLOBAL TECHNOLOGIES, INC., Dearborn, MI (US)

(72) Inventors: Jason Meyer, Canton, MI (US); Sangeetha Sangameswaran, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 335 days.

(21) Appl. No.: 14/964,949

(22) Filed: Dec. 10, 2015

(65) Prior Publication Data

US 2016/0093125 A1 Mar. 31, 2016

Related U.S. Application Data

(63) Continuation of application No. 14/282,352, filed on May 20, 2014, now Pat. No. 9,272,712.

(51) Int. Cl.

| | |
|---|---|
| *B60W 30/00* | (2006.01) |
| *G07C 5/08* | (2006.01) |
| *B60L 15/20* | (2006.01) |
| *B60K 31/00* | (2006.01) |
| *B60W 40/076* | (2012.01) |

(52) U.S. Cl.
CPC ............ *G07C 5/0808* (2013.01); *B60K 31/00* (2013.01); *B60L 15/2045* (2013.01); *B60W 40/076* (2013.01); *G07C 5/085* (2013.01); *B60L 2240/12* (2013.01); *B60L 2240/421* (2013.01); *B60L 2240/423* (2013.01); *B60L 2260/46* (2013.01); *B60L 2260/52* (2013.01); *B60L 2260/54* (2013.01); *Y02T 10/645* (2013.01); *Y02T 10/72* (2013.01); *Y02T 10/7283* (2013.01)

(58) Field of Classification Search
None
See application file for complete search history.

(56) References Cited

U.S. PATENT DOCUMENTS

| | | | |
|---|---|---|---|
| 3,908,451 A | 9/1975 | Walker et al. | |
| 6,411,888 B1 | 6/2002 | Weisman, II et al. | |
| 7,091,839 B2 * | 8/2006 | Situ ........................ | B60K 37/02 340/438 |
| 7,849,944 B2 * | 12/2010 | DeVault ................. | B60K 6/365 180/65.29 |
| 7,993,243 B2 * | 8/2011 | Silveri .................... | B60K 6/52 477/125 |
| 8,346,420 B2 | 1/2013 | Tarnowsky et al. | |
| 8,406,948 B2 | 3/2013 | Wang et al. | |
| 8,428,804 B2 * | 4/2013 | Sakai ...................... | B60L 7/16 180/65.28 |

(Continued)

FOREIGN PATENT DOCUMENTS

WO 2011123690 A1 10/2011

*Primary Examiner* — Jonathan M Dager
(74) *Attorney, Agent, or Firm* — Carlson, Gaskey & Olds

(57) ABSTRACT

A method according to an exemplary aspect of the present disclosure includes, among other things, learning an energy consumption efficiency of a vehicle in an energy domain by periodically filtering a ratio of a distance traveled to an energy consumed. The learning step is executed by a control module configured to monitor the energy consumption efficiency.

20 Claims, 3 Drawing Sheets

(56) References Cited

U.S. PATENT DOCUMENTS

| | | | |
|---|---|---|---|
| 8,498,792 B2 | 7/2013 | Abboud et al. | |
| 8,565,952 B2* | 10/2013 | Mehr | B60L 11/00 180/65.265 |
| 8,583,343 B2* | 11/2013 | Yamada | B60K 6/46 701/99 |
| 8,600,672 B2* | 12/2013 | Hidaka | B60K 6/48 701/490 |
| 8,606,513 B2* | 12/2013 | Chen | B60L 11/14 701/22 |
| 8,612,082 B2* | 12/2013 | Hashimoto | G01C 21/3469 701/1 |
| 8,666,576 B2 | 3/2014 | Kim | |
| 8,725,331 B2* | 5/2014 | Yoshida | B60L 11/1842 701/22 |
| 2005/0128065 A1* | 6/2005 | Kolpasky | G09F 21/04 340/461 |
| 2005/0228553 A1* | 10/2005 | Tryon | B60K 6/46 701/22 |
| 2007/0112475 A1* | 5/2007 | Koebler | B60L 3/12 701/1 |
| 2007/0208468 A1* | 9/2007 | Sankaran | B60K 6/445 701/31.4 |
| 2008/0119982 A1* | 5/2008 | Yamada | B60L 3/12 701/33.4 |
| 2008/0215201 A1* | 9/2008 | Okubo | B60K 6/365 701/22 |
| 2009/0099724 A1* | 4/2009 | Kranz | G01F 1/115 701/33.4 |
| 2009/0288896 A1* | 11/2009 | Ichikawa | B60K 6/365 180/65.265 |
| 2010/0106352 A1* | 4/2010 | Skaff | B60K 6/445 701/22 |
| 2010/0121514 A1* | 5/2010 | Kato | B60K 6/48 701/22 |
| 2010/0161166 A1* | 6/2010 | Yamada | B60K 6/46 701/22 |
| 2010/0305799 A1* | 12/2010 | Yamada | B60K 6/46 701/22 |
| 2011/0022255 A1* | 1/2011 | Yamada | B60K 6/46 701/22 |
| 2011/0029168 A1* | 2/2011 | Talberg | B60K 6/48 701/22 |
| 2011/0029184 A1* | 2/2011 | Brighenti | B60W 30/0953 701/31.4 |
| 2011/0040438 A1* | 2/2011 | Kluge | G01C 21/3469 701/31.4 |
| 2011/0160946 A1* | 6/2011 | Wilde | B60W 10/06 701/22 |
| 2011/0166732 A1* | 7/2011 | Yu | B60W 10/26 701/22 |
| 2011/0172867 A1* | 7/2011 | Yu | B60K 6/445 701/22 |
| 2011/0313647 A1* | 12/2011 | Koebler | B60L 15/2045 701/123 |
| 2012/0010767 A1* | 1/2012 | Phillips | G01C 21/3469 701/22 |
| 2012/0035795 A1* | 2/2012 | Yu | B60W 50/0097 701/22 |
| 2012/0179420 A1* | 7/2012 | Gilman | B60K 35/00 702/165 |
| 2012/0303198 A1 | 11/2012 | Wada | |
| 2013/0041552 A1 | 2/2013 | MacNeille et al. | |
| 2013/0066493 A1* | 3/2013 | Martin | B60W 20/00 701/22 |
| 2013/0073113 A1 | 3/2013 | Wang et al. | |
| 2013/0226367 A1 | 8/2013 | MacNeille et al. | |
| 2013/0311016 A1* | 11/2013 | Kim | B60L 11/1862 701/22 |
| 2014/0067246 A1 | 3/2014 | Eldredge et al. | |
| 2014/0163789 A1* | 6/2014 | Yu | B60W 10/06 701/22 |
| 2014/0195116 A1* | 7/2014 | Hrovat | B60W 10/06 701/38 |
| 2014/0277835 A1* | 9/2014 | Filev | G01C 21/3469 701/2 |
| 2015/0046070 A1* | 2/2015 | Awadi | F02D 17/04 701/112 |
| 2015/0298680 A1* | 10/2015 | Matthews | B60W 20/00 701/22 |
| 2016/0001658 A1* | 1/2016 | Meyer | B60L 3/12 701/22 |
| 2016/0023554 A1* | 1/2016 | Tseng | B60L 3/12 701/22 |
| 2016/0063772 A1* | 3/2016 | Esler | G07C 5/004 701/123 |
| 2016/0318384 A1* | 11/2016 | Venturi | B60K 6/365 |
| 2017/0184413 A1* | 6/2017 | Gilman | B60K 35/00 |

\* cited by examiner

VEHICLE ENERGY CONSUMPTION EFFICIENCY LEARNING IN THE ENERGY DOMAIN

CROSS REFERENCE TO RELATED APPLICATION

This application is a continuation of U.S. patent application Ser. No. 14/282,352, which was filed on May 20, 2014.

TECHNICAL FIELD

This disclosure relates to a vehicle, and more particularly, but not exclusively, to energy consumption efficiency learning in the energy domain via an energy triggered filter.

BACKGROUND

An energy source in necessary to provide power for propelling a vehicle. For example, petroleum based products, such as gasoline or diesel, are the main energy source of conventional vehicles that include internal combustion engines. On the other hand, electrified vehicles are known that utilize one or more electric machines and in some cases an engine that can be used either individually or in combination to propel the vehicle. A high voltage battery typically acts as one energy source for powering such electric machines.

It may be beneficial to calculate the energy use of a vehicle in order to display a variety of end use features to the vehicle driver. For example, an energy consumption rate may be monitored and used to predict a distance to empty (DTE) value which can be displayed to the vehicle driver to provide information for trip planning, minimizing driving costs, evaluating vehicle performance, etc. One current method used to monitor energy use of a vehicle is a time domain approach. However, other approaches may provide improvements to existing methods.

SUMMARY

A method according to an exemplary aspect of the present disclosure includes, among other things, learning an energy consumption efficiency of a vehicle in an energy domain by periodically filtering a ratio of a distance traveled to an energy consumed. The learning step is executed by a control module configured to monitor the energy consumption efficiency.

In a further non-limiting embodiment of the foregoing method, the learning step includes monitoring the energy consumption and periodically adapting an energy consumption efficiency prediction.

In a further non-limiting embodiment of either of the foregoing methods, the learning step includes integrating a speed of the vehicle to obtain the distance traveled and integrating a power consumption of the vehicle to obtain the energy consumed.

In a further non-limiting embodiment of any of the foregoing methods, the filtering step is selectively performed after the integrating steps.

In a further non-limiting embodiment of any of the foregoing methods, the method includes multiplying the ratio by a filter constant.

In a further non-limiting embodiment of any of the foregoing methods, the method includes updating the energy consumption efficiency if the energy consumed since a prior integrator reset is greater than or equal to an energy consumed threshold.

In a further non-limiting embodiment of any of the foregoing methods, the method includes using a prior energy consumption efficiency if the energy consumed since the prior integrator reset is not greater than or equal to the energy consumed threshold.

In a further non-limiting embodiment of any of the foregoing methods, the method includes resetting a vehicle speed integral and a power consumption integral if the energy consumed since a prior integrator reset is greater than or equal to an energy consumed threshold.

In a further non-limiting embodiment of any of the foregoing methods, the method includes utilizing the energy consumption efficiency to calculate at least one end use feature associated with the vehicle.

In a further non-limiting embodiment of any of the foregoing methods, the at least one end use feature is a distance to empty estimation.

In a further non-limiting embodiment of any of the foregoing methods, the at least one end use feature is an instantaneous consumption rate display.

In a further non-limiting embodiment of any of the foregoing methods, the at least one end use feature is at least one of an average consumption rate/efficiency over a trip odometer, a running average consumption rate/efficiency for a current key cycle and a lifetime running average consumption rate/efficiency.

In a further non-limiting embodiment of any of the foregoing methods, the at least one end use feature is at least one of a grade estimation and a towing load estimation.

In a further non-limiting embodiment of any of the foregoing methods, the at least one end use feature is an ECO-routing or an ECO-coaching feature.

In a further non-limiting embodiment of any of the foregoing methods, the method includes suspending the learning step during steep grade driving conditions.

A vehicle according to another exemplary aspect of the present disclosure includes, among other things, a transmission, a propulsion device coupled to wheels by the transmission, an energy source configured to power the propulsion device, and a control module in electrical communication with the propulsion device and the energy source. The control module is configured to learn an energy consumption efficiency associated with the vehicle in an energy domain.

In a further non-limiting embodiment of the foregoing vehicle, the control module is configured to update the energy consumption efficiency each time a predefined amount of energy is consumed by the propulsion device.

In a further non-limiting embodiment of either of the foregoing vehicles, the control module is configured to suspend learning the energy consumption efficiency of the vehicle during steep grade driving conditions.

In a further non-limiting embodiment of any of the foregoing vehicles, the control module is configured to integrate a speed of the vehicle to obtain a distance travelled and integrate a power consumption of the vehicle to obtain an energy consumed.

In a further non-limiting embodiment of any of the foregoing vehicles, the control module is configured to filter a ratio of the distance travelled to the energy consumed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to vehicle energy consumption efficiency learning. The vehicle may be an electrified vehicle, a conventional vehicle, or any other vehicle type. In one embodiment, the energy consumption efficiency learning is performed in an energy domain via an energy triggered filter. The learned energy consumption efficiency may be used to calculate one or more end use features associated with the vehicle. These and other features are discussed in greater detail herein.

Figure 1:
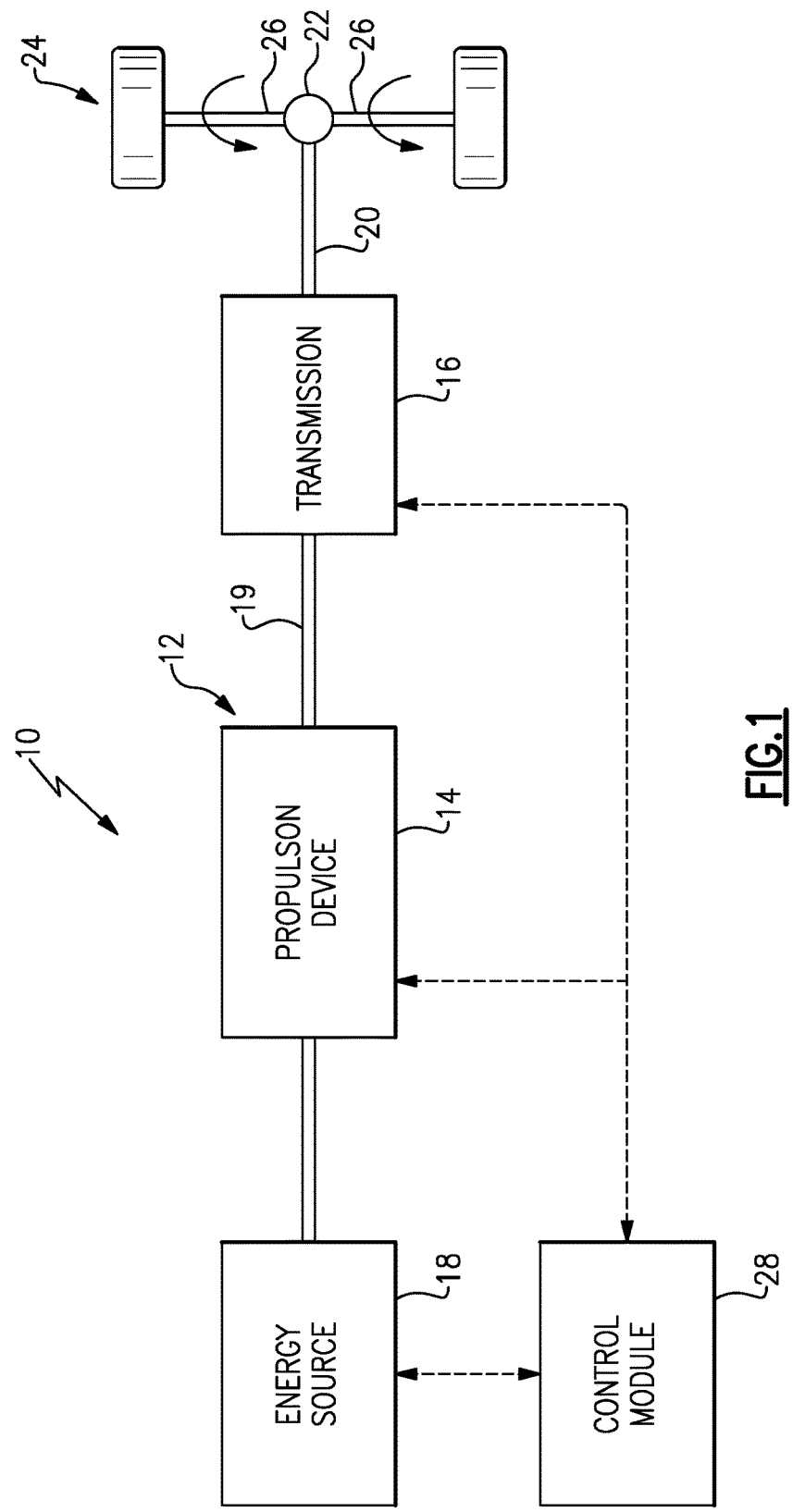
FIG. 1 schematically illustrates a powertrain of a vehicle.

FIG. 1 schematically illustrates a vehicle 10. This disclosure is applicable to any type of vehicle. For example, the vehicle 10 could be a conventional vehicle that is powered by an internal combustion engine, or could be an electrified vehicle that utilizes one or more electric machines in addition to, or as an alternative to, an engine.

The exemplary vehicle 10 includes a powertrain 12. The powertrain 12 may include a propulsion device 14 and a transmission 16 that is selectively driven by the propulsion device 14. The propulsion device 14 may be employed as an available drive source for the vehicle 10. For example, the propulsion device 14 could include an engine for a conventional vehicle, or an electric machine (i.e., an electric motor, a generator or a combined motor/generator) for an electrified vehicle.

The transmission 16 may include a gearbox having multiple gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission input shaft 19 and a transmission output shaft 20. The transmission 16 may alternatively be controlled to achieve an infinite number of ratios. These ratios can be achieved through mechanical reconfiguration as in a continuously variable transmission (CVT) or by electrical coordinate of the speeds of electric machines as in an electrically continuously variable transmission (eCVT). The transmission 16 may be automatically shifted from one ratio to another based on various vehicle and ambient operating conditions by an associated control module 28. The transmission 16 then provides powertrain output torque to the transmission output shaft 20. The transmission output shaft 20 may be connected to a differential 22. The differential 22 drives a pair of wheels 24 via respective axles 26 that are connected to the differential 22 to propel the vehicle 10.

An energy source 18 may supply power to the propulsion device 14. The energy source 18 may be a fuel system if the propulsion device 14 is an engine or a high voltage battery if the propulsion device 14 is an electric machine. For example, an engine is configured to consume fuel (i.e., gasoline, diesel, etc.) to produce a motor output, whereas the high voltage battery is configured to output and receive electrical energy that is consumed by the electric machine to produce a motor output.

The powertrain 12 of the vehicle 10 may additionally include an associated control module 28. While schematically illustrated as a single module, the control module 28 may be part of a larger control system and may be controlled by various other controllers throughout the vehicle 10, such as a vehicle system controller (VSC) that includes a powertrain control unit, a transmission control unit, engine control unit, etc. It should therefore be understood that the control module 28 and one or more other controllers can collectively be referred to as a "control module" that controls, such as through a plurality of integrated algorithms, various actuators in response to signals from various sensors to control functions associated with the vehicle 10. In one embodiment, the various controllers that make up the VSC may communicate with one another using a common bus protocol (e.g., CAN).

The control module 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module 28 to control the vehicle 10.

The control module 28 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control module 28 may communicate signals to and/or from the propulsion device 14, the transmission 16, and the energy source 18. In other words, these devices are in electrical communication with one another. Although not explicitly illustrated, those of ordinary skill in the art will recognize various functions or components that may be controlled by the control module 28 within each of the subsystems identified above.

Of course, the control logic stored on the control module 28 may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

In one non-limiting embodiment, the control module 28 is configured to control the vehicle 10 based on a learned energy consumption efficiency. The energy consumption efficiency is "learned" in that the control module 28 continuously monitors the energy consumption efficiency (e.g., miles/gallon, miles/kW-hr, etc.) of the vehicle 10 and selectively adapts the energy consumption efficiency based on a detected change in the energy consumption efficiency. One non-limiting method for learning a vehicle's energy consumption efficiency is described below with respect to FIG. 2.

Figure 2:
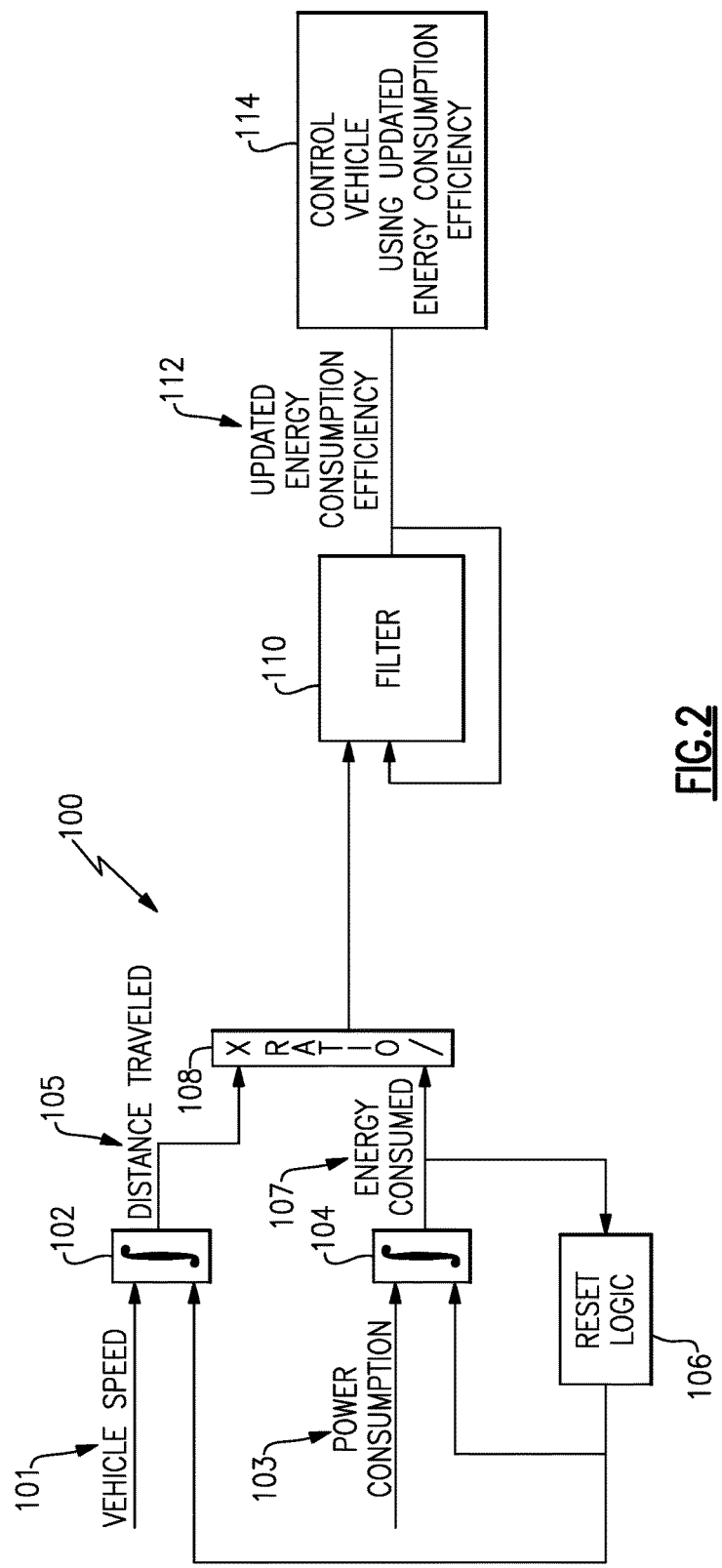
FIG. 2 schematically illustrates a control strategy for learning an energy consumption efficiency of a vehicle in an energy domain.

FIG. 2, with continued reference to FIG. 1, schematically illustrates a control strategy 100 that may be executed by the control module 28 of the vehicle 10 for learning an energy consumption efficiency of the vehicle 10. The control module 28 may be programmed to employ one or more algorithms in order to perform the exemplary control strategy 100. In one non-limiting embodiment, at least equations (1) through (3) (presented below) may be programmed into the control module 28 as part of an algorithm for learning the energy consumption efficiency of the vehicle 10.

The control strategy 100 may represent control logic that is implemented by the control module 28 using hardware, software, or a combination of hardware and software. For example, the various functions may be performed using a programmed microprocessor. The control logic may be implemented using any of a number of known programming or processing techniques or strategies and is not limited to the order or sequence illustrated.

In one non-limiting embodiment, the control strategy 100 learns the energy consumption efficiency of the vehicle 10 in an energy domain. In other words, the energy consumption efficiency is updated at regular energy consumption intervals (i.e., every time a predefined amount of energy is consumed by the vehicle 10) as opposed to updating in the time domain at regular time intervals.

The control strategy 100 may begin by integrating a vehicle speed 101 (such as in kilometers/hour (kph) or miles/hour (mph)) and a power consumption 103 (such as in watts (W) or milligrams of fuel per second (mg/s)) of the vehicle 10 at integrator blocks 102 and 104, respectively. The vehicle speed 101 and the power consumption 103 are known values. In one embodiment, the vehicle speed 101 and the power consumption 103 are measured, sensed and/or calculated by the control module 28 or by some other component(s) that are in communication with the control module 28 prior to performing the integration at integrator blocks 102, 104.

The power consumption 103 is not necessarily limited to total power of the vehicle 10. Power consumption 103 can refer to propulsive power. Other loads like climate loads, accessory loads, etc. can be calculated in a different domain and then combined with the energy consumption efficiency of the vehicle 10 as desired. In other words, although the control strategy 100 is described herein as an energy domain approach, the energy domain approach could be combined with a time or distance domain approach.

A distance traveled 105 (such as in kilometers (km) or miles (m)) may be obtained by integrating the vehicle speed 101. In addition, an energy consumed 107 (such as in kW-hr or gallons of fuel) can be obtained by integrating the power consumption 103 of the vehicle 10 and scaling based on application unit conversions. In the discrete time domain, the integration of the vehicle speed 101 that occurs at integrator block 102 may be represented by equation (1), and the integration of the power consumption 103 that occurs at integrator block 104 may be represented by equation (2). These equations are presented below:

$$d_{traveled}(k) = d_{traveled}(k-1) + v(k)\Delta t \quad (1)$$

$$E_{consumed}(k) = E_{consumed}(k-1) + P(k)\Delta t \quad (2)$$

where:
$d_{traveled}$ is the distance traveled since a previous integrator reset;
$E_{consumed}$ is the energy consumed since a previous integrator reset;
P is the total power consumption;
v is the vehicle speed;
k is the discrete time index (i.e., an arbitrary value); and
$\Delta t$ is the sampling time of the control module 28.

If the energy consumed 107 since a previous integrator reset is greater than or equal to an energy consumed threshold, then the energy consumption efficiency should be updated. The energy consumed threshold may be any threshold, and its actual value could depend on multiple factors including but not limited to the vehicle type. The control strategy 100 ends if the energy consumed threshold has not been exceeded by the energy consumed 107. In other words, the estimated energy consumption efficiency remains constant and is not updated.

However, if the control module 28 determines that the energy consumed threshold has been exceeded, the integrator blocks 102 and 104 are both reset by a reset logic block 106. In other words, the reset logic block 106 resets the integrator blocks 102, 104 to zero. By way of one non-limiting embodiment, if the energy consumed exceeds an energy consumption threshold of 10 W-hr, for example, then the energy consumed and the distance threshold is set to zero such that another 10 W-hr must be consumed before the next update. This update is based on the distance traveled during the interval over which that particular 10 W-hr is consumed.

The control strategy 100 then proceeds to block 108. At block 108, a ratio of the distance traveled 105 to the energy consumed 107 is obtained.

The ratio from block 108 is next filtered at filter block 110. The filter block 110 filters out noise and selectively adapts an average energy consumption efficiency. In one non-limiting embodiment, for a first order discrete filter, the energy consumption efficiency can be calculated according to the following equation:

$$\gamma(k) = \begin{cases} (1 - \tau_E^*(k))\gamma(k-1) + \tau_E^*(k)\gamma_{input}(k) & \text{if } E_{traveled} \geq E_{threshold} \\ \gamma(k-1) & \text{otherwise} \end{cases} \quad (3)$$

Where:

$$\tau_E^*(k) = \max\left(\tau_E \frac{E_{traveled}(k)}{E_{threshold}}, 1\right);$$

$$\gamma_{input}(k) = \frac{d_{traveled}(k)}{E_{consumed}(k)};$$

$\gamma$ is the learned energy consumption efficiency;
$\gamma_{input}$ is the energy consumption efficiency of the current interval;
$E_{threshold}$ is the energy consumed threshold; and $\tau_E$ is the filter constant of the discrete filter in units of energy (i.e., a filter constant).

The filter block 110 calculates an updated energy consumption efficiency 112. The updated energy consumption efficiency 112 can be used to control the vehicle 10 at block 114. For example, the learned energy consumption efficiency can be used to calculate at least one end used feature associated with the vehicle 10. In one non-limiting embodiment, the end use feature includes a distance to empty estimation. However, other end use features are additionally contemplated, including but not limited to, instantaneous consumption rate display, average consumption rate/efficiency over the trip odometer, running average consumption rate/efficiency for the current key cycle, lifetime running average consumption rate/efficiency, grade estimation, towing load estimation, energy management, adaptive ECO-routing, ECO-coaching, etc.

In another embodiment, once the updated energy consumption efficiency 112 has been calculated or "learned," an energy consumption rate associated with the vehicle 10 can also be calculated. The energy consumption rate is calculated by taking the inverse of the energy consumption efficiency. Knowing the energy consumption rate can also be helpful for controlling the vehicle 10 or for estimating various end use features associated with the vehicle 10.

Learning the energy consumption efficiency in the energy domain as detailed above provides an unbiased estimate of energy consumption efficiency in which an arbitrary learning rate can be chosen. Thus, the control strategy 100 can be used for all applications regardless of time scale requirements.

Figure 3:
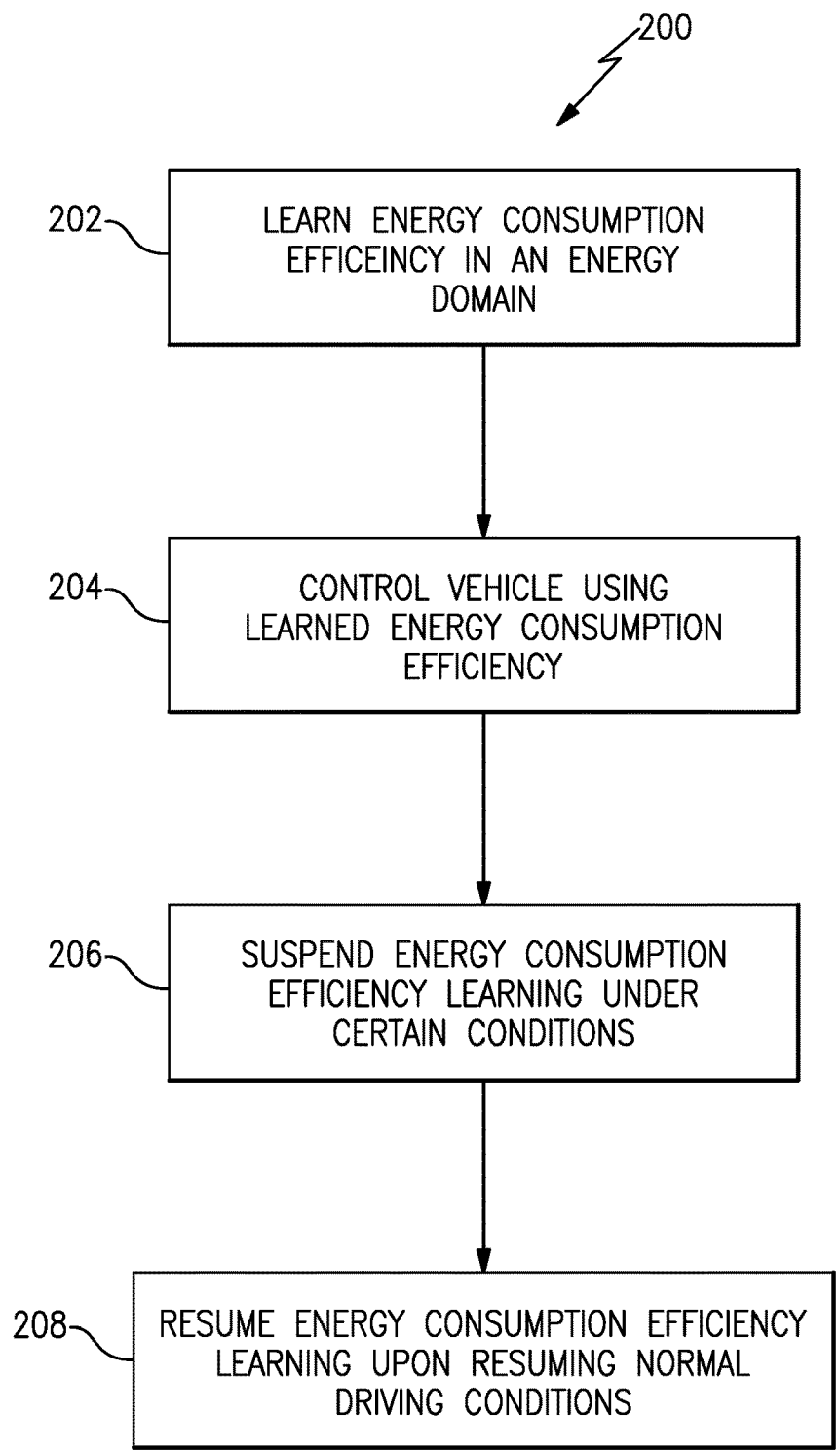
FIG. 3 illustrates a control strategy according to a second embodiment of this disclosure.

FIG. 3 schematically illustrates a control strategy 200 according to another embodiment of this disclosure. In this embodiment, the control strategy 200 includes learning an energy consumption efficiency of the vehicle 10 in an energy domain at block 202. For example, the energy consumption efficiency may be learned by preprocessing a time domain input and then intelligently triggering an update of an energy domain filter.

Next, at block 204, the vehicle 10 is controlled using the learned energy consumption efficiency. For example, a plurality of end use features may be calculated and displayed to a vehicle driver by using the learned energy consumption efficiency.

As shown at block 206, the control strategy 200 can periodically suspend energy consumption efficiency learning under certain conditions. By way of one non-limiting embodiment, the control strategy 200 can be temporarily suspended if the vehicle 10 is driving down a steep grade and it is desired to not have the energy consumption efficiency of the vehicle reflected during such a driving situation. Other conditions may also call for suspending the energy consumption efficiency learning. The control strategy 200 could resume learning at block 208 once normal driving conditions have been resumed.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
learning an energy consumption efficiency of a vehicle in an energy domain by periodically filtering a ratio of a distance traveled to an energy consumed, wherein the learning step is executed by a control module that is configured to monitor the energy consumption efficiency; and
utilizing the energy consumption efficiency to calculate at least one of a grade estimation and a towing load estimation; and
controlling a transmission, a propulsion device, or an energy source of the vehicle based on the grade estimation or the towing load estimation.

2. The method as recited in claim 1, wherein the learning includes monitoring the energy consumption and periodically adapting an energy consumption efficiency prediction.

3. The method as recited in claim 1, wherein the learning includes:
integrating a speed of the vehicle to obtain the distance traveled; and
integrating a power consumption of the vehicle to obtain the energy consumed.

4. The method as recited in claim 3, wherein the filtering is selectively performed after the integrating steps.

5. The method as recited in claim 3, comprising multiplying the ratio by a filter constant.

6. The method as recited in claim 3, comprising updating the energy consumption efficiency if the energy consumed since a prior integrator reset is greater than or equal to an energy consumed threshold.

7. The method as recited in claim 6, comprising using a prior energy consumption efficiency if the energy consumed since the prior integrator reset is not greater than or equal to the energy consumed threshold.

8. The method as recited in claim 3, comprising resetting a vehicle speed integral and a power consumption integral if the energy consumed since a prior integrator reset is greater than or equal to an energy consumed threshold.

9. The method as recited in claim 1, comprising utilizing the energy consumption efficiency to calculate at least one end use feature associated with the vehicle.

10. The method as recited in claim 9, wherein the at least one end use feature is a distance to empty estimation.

11. The method as recited in claim 9, wherein the at least one end use feature is an instantaneous consumption rate display.

12. The method as recited in claim 9, wherein the at least one end use feature is at least one of an average consumption rate/efficiency over a trip odometer, a running average consumption rate/efficiency for a current key cycle and a lifetime running average consumption rate/efficiency.

13. The method as recited in claim 9, wherein the at least one end use feature is an ECO-routing or an ECO-coaching feature.

14. The method as recited in claim 1, comprising suspending the learning during steep grade driving conditions.

15. A vehicle, comprising:
a transmission;

a propulsion device coupled to wheels by said transmission;

an energy source configured to power said propulsion device; and a control module configured to learn an energy consumption efficiency associated with the vehicle in an energy domain and calculate at least one of a grade estimation and a towing load estimation based on the learned energy consumption efficiency, wherein the control module is further configured to control the transmission, the propulsion device, or the energy source based on the grade estimation or the towing load estimation.

16. The vehicle as recited in claim 15, wherein the control module is configured to update the energy consumption efficiency each time a predefined amount of energy is consumed by the propulsion device.

17. The vehicle as recited in claim 15, wherein the control module is configured to suspend learning the energy consumption efficiency of the vehicle during steep grade driving conditions.

18. The vehicle as recited in claim 15, wherein the control module is configured to:
   integrate a speed of the vehicle to obtain a distance travelled; and
   integrate a power consumption of the vehicle to obtain an energy consumed.

19. The vehicle as recited in claim 18, wherein the control module is configured to filter a ratio of the distance travelled to the energy consumed.

20. The method as recited in claim 1, wherein learning the energy consumption efficiency in the energy domain includes updating the energy consumption efficiency each time a predefined amount of energy is consumed by the vehicle.

* * * * *